(12) United States Patent
Rivera

(10) Patent No.: US 8,166,873 B2
(45) Date of Patent: May 1, 2012

(54) AUTOMATED JUICE EXTRACTOR

(76) Inventor: Adrian Rivera, Whittier, CA (US)

( * ) Notice: Subject to any disclaimer, the term of this patent is extended or adjusted under 35 U.S.C. 154(b) by 555 days.

(21) Appl. No.: 12/406,314

(22) Filed: Mar. 18, 2009

(65) Prior Publication Data
US 2010/0058939 A1    Mar. 11, 2010

Related U.S. Application Data

(63) Continuation-in-part of application No. 12/206,964, filed on Sep. 9, 2008.

(51) Int. Cl.
*A23J 1/00* (2006.01)
(52) U.S. Cl. ............... 99/501; 99/495; 99/502; 99/503
(58) Field of Classification Search ............ 99/495, 99/289 R, 382 P, 382 R, 501, 502, 506, 510, 99/511
See application file for complete search history.

(56) References Cited

U.S. PATENT DOCUMENTS

| | | | | |
|---|---|---|---|---|
| 3,530,734 A | * | 9/1970 | Wray et al. | 74/89.3 |
| 4,827,789 A | * | 5/1989 | Hallidy et al. | 74/89.27 |
| 5,193,447 A | * | 3/1993 | Lucas et al. | 99/508 |
| RE34,882 E | * | 3/1995 | Meyn | 452/117 |
| 5,558,487 A | * | 9/1996 | Nakagawa | 414/744.6 |
| 5,634,376 A | * | 6/1997 | Kitamura | 74/490.03 |
| 5,910,192 A | * | 6/1999 | Pulford et al. | 74/479.01 |
| 6,050,180 A | * | 4/2000 | Moline | 99/511 |
| 6,070,519 A | * | 6/2000 | Sham et al. | 99/348 |
| 7,484,455 B2 | * | 2/2009 | De'Longhi | 99/330 |
| 7,562,594 B2 | * | 7/2009 | Nagai et al. | 74/89.23 |
| 2005/0126404 A1 | * | 6/2005 | Basora | 99/501 |
| 2006/0169152 A1 | * | 8/2006 | Lin et al. | 99/495 |
| 2006/0213375 A1 | * | 9/2006 | Moline | 99/495 |
| 2007/0125244 A1 | | 6/2007 | Hensel | |
| 2009/0092722 A1 | * | 4/2009 | Burlington et al. | 426/489 |

FOREIGN PATENT DOCUMENTS

WO    PCT/IB2006/000033    *    5/2006

* cited by examiner

*Primary Examiner* — Gene Kim
*Assistant Examiner* — John E Simms, Jr.
(74) *Attorney, Agent, or Firm* — Kenneth L. Green

(57) ABSTRACT

An automatic juicer turns and pushes an upward facing juicing cone into a fruit for releasing and collecting juice. The juicer includes a base containing a motor, gear and shaft assembly which rises as a unit with the juicing cone. A fixed guide extends upward from the base and inner and outer shafts reside inside the fixed guide and are driven by the motor and gear assembly to rotate and advance the juicing cone into the fruit. The juicing cone, strainer and a bowl release and catch the juice. The outer shaft includes threads to vertically advance and retreat the outer and inner shafts when the outer shaft turns. The inner shaft rises with the outer shaft and lifts and rotates the juicing cone, thereby releasing juice from the fruit. The bowl is fixed to the base.

18 Claims, 12 Drawing Sheets

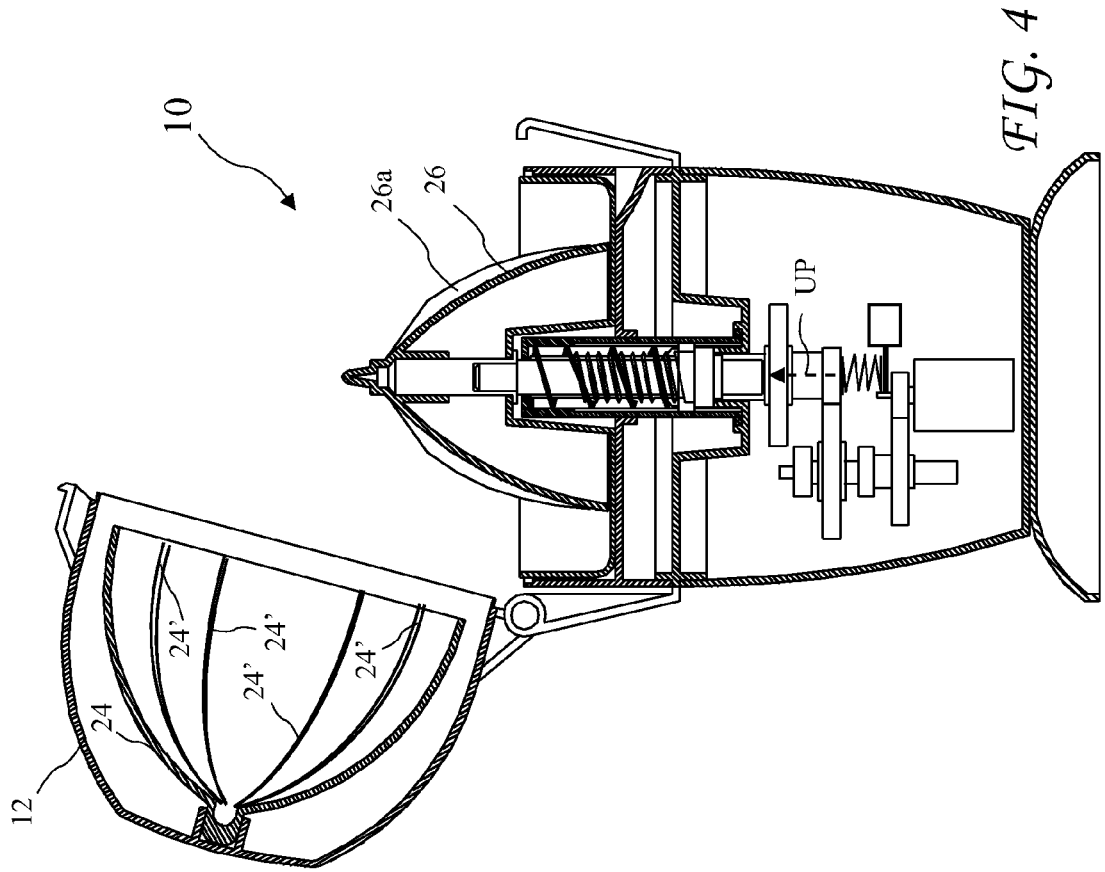
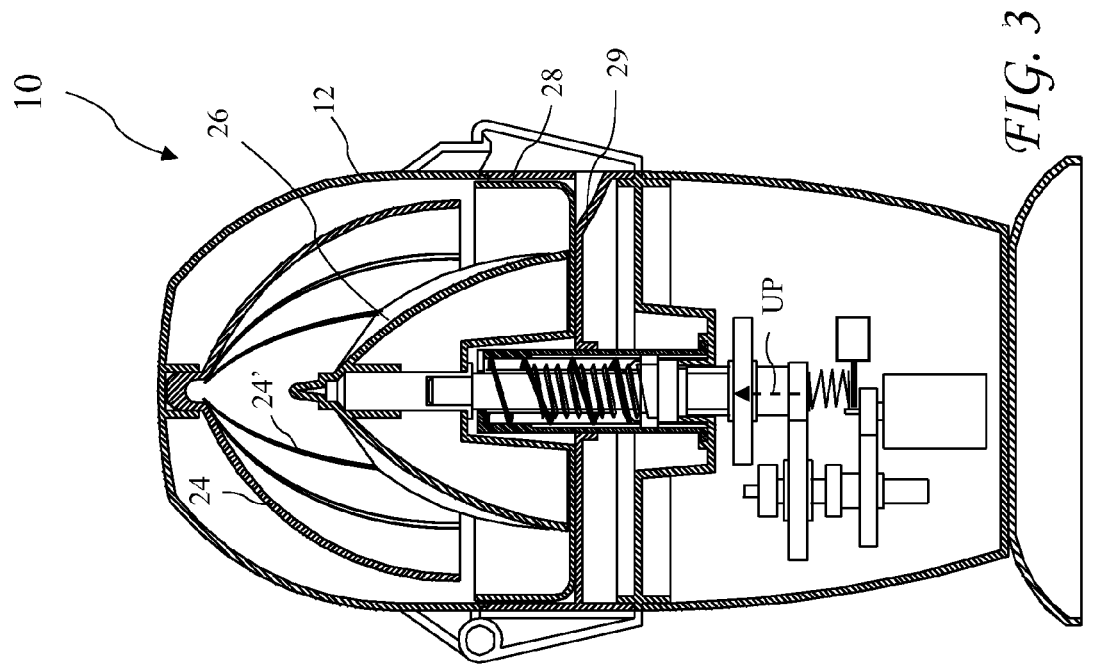

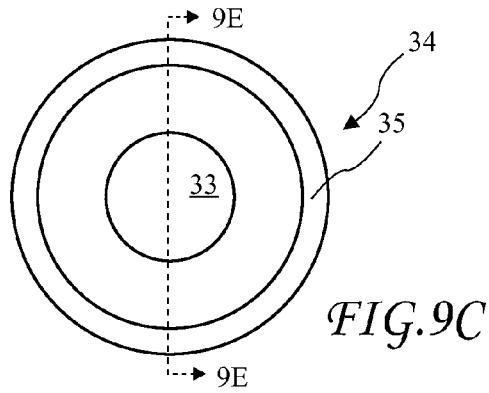
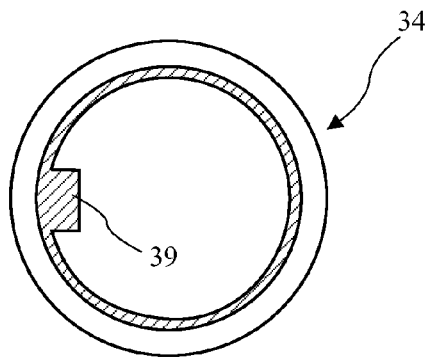
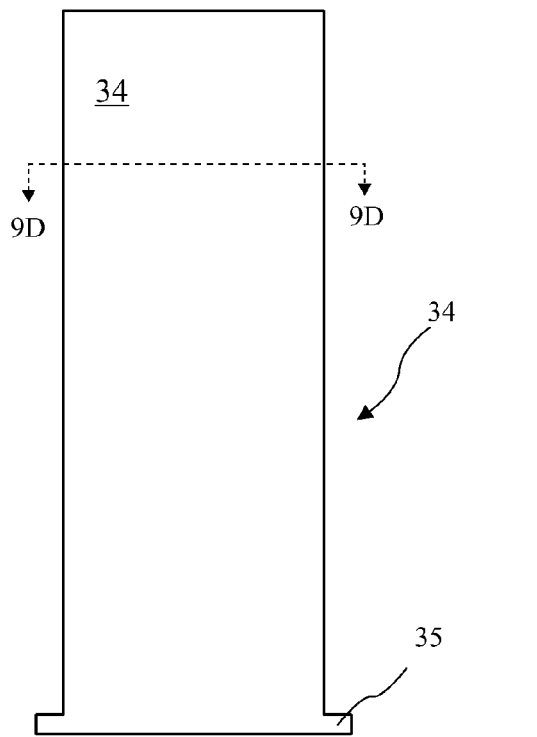
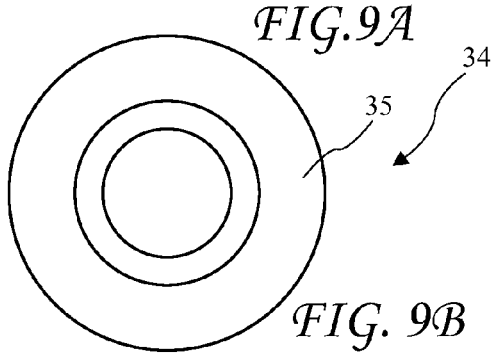
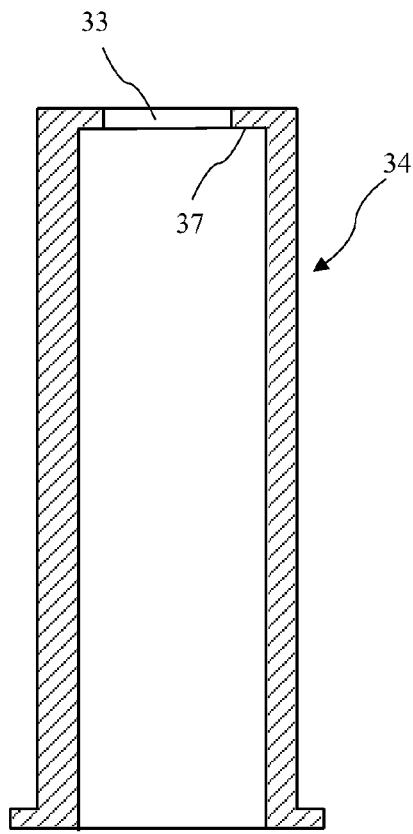

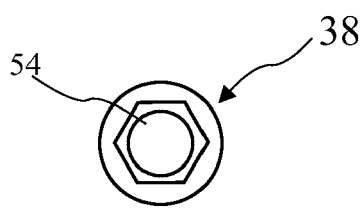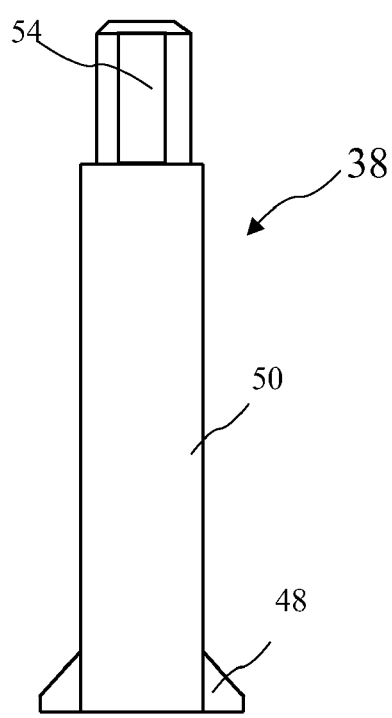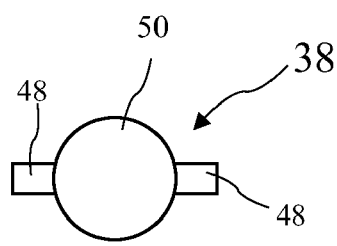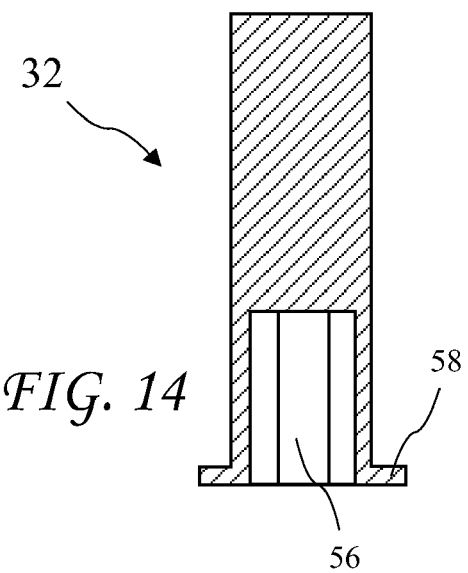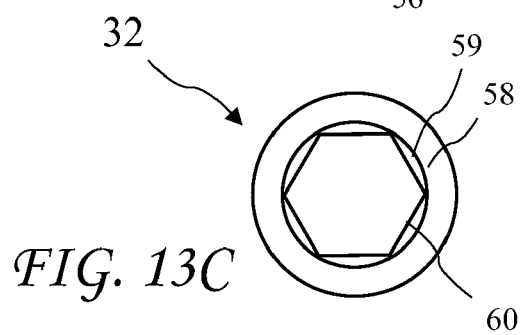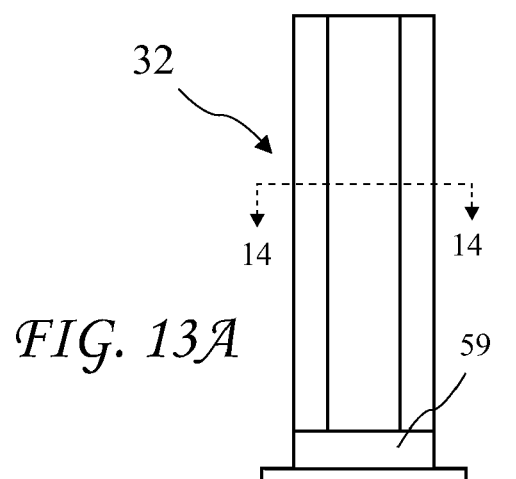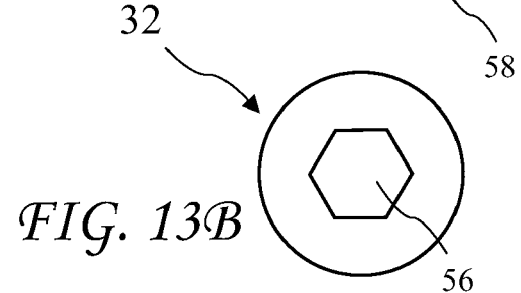

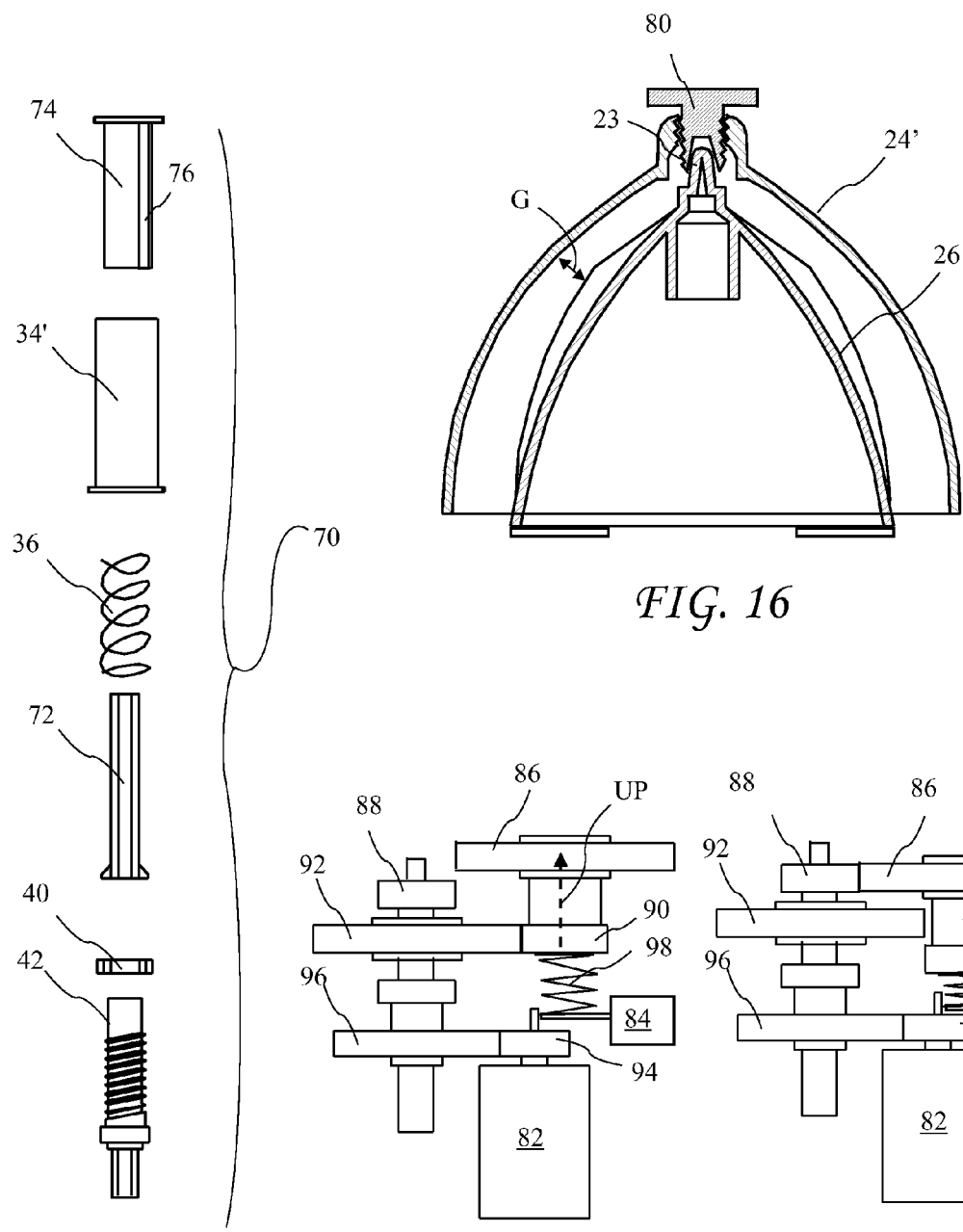

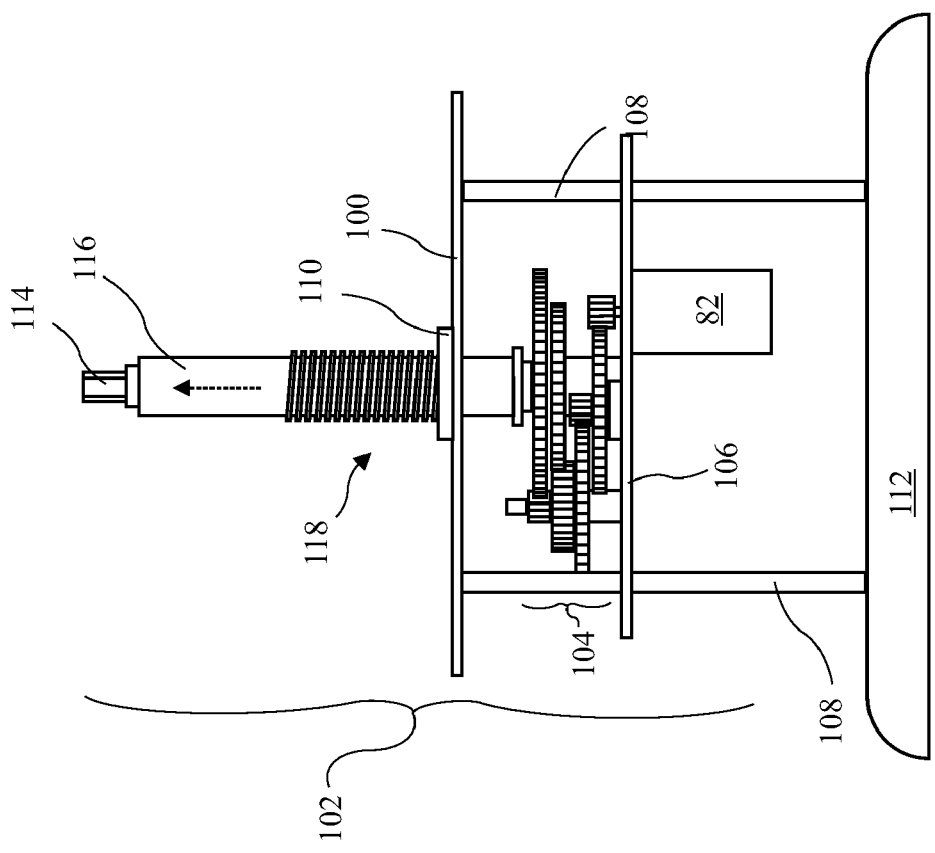
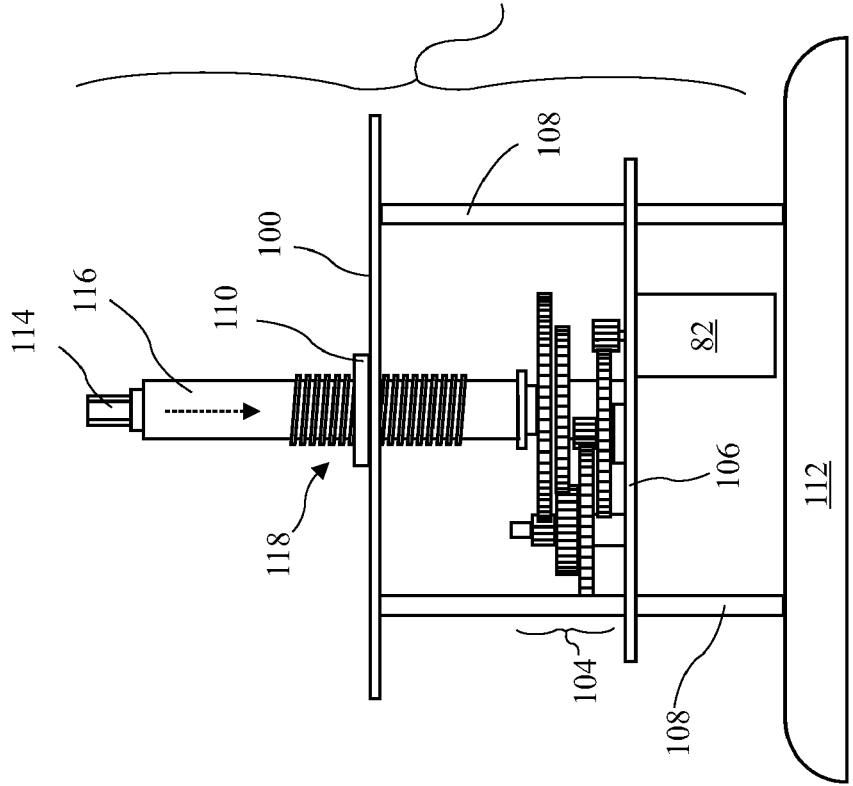

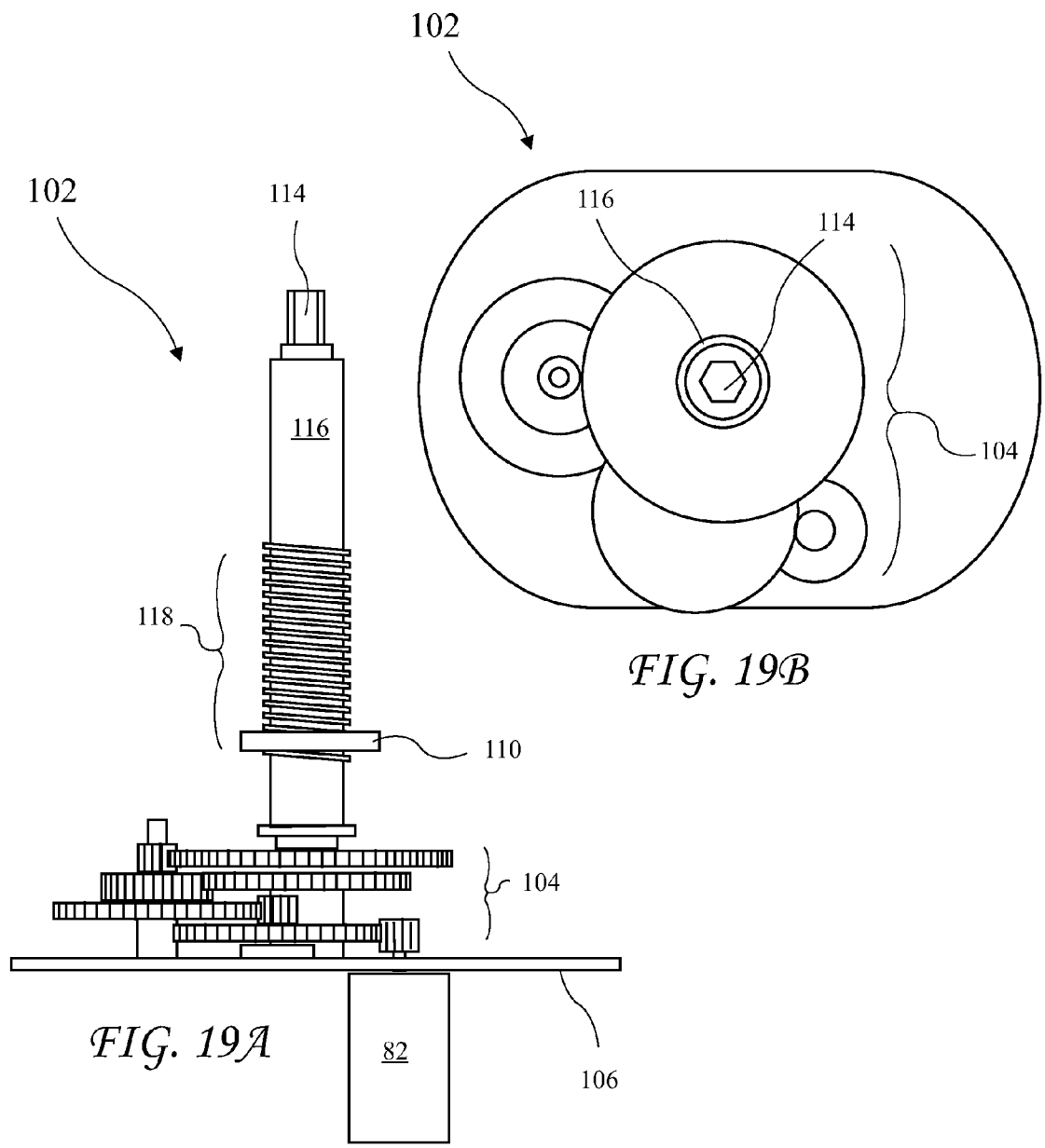

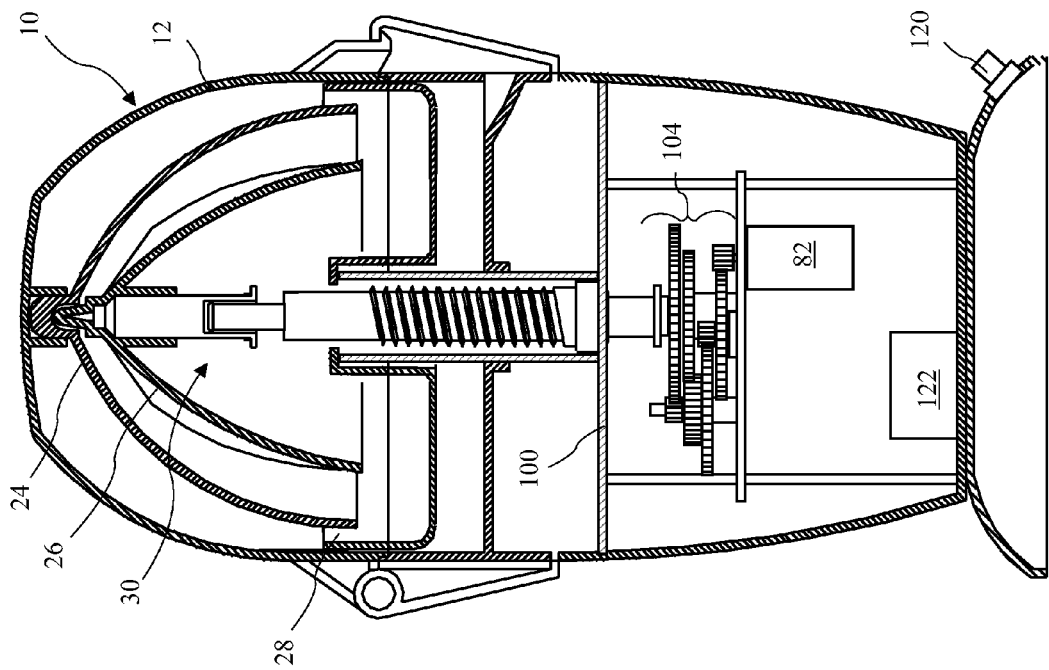
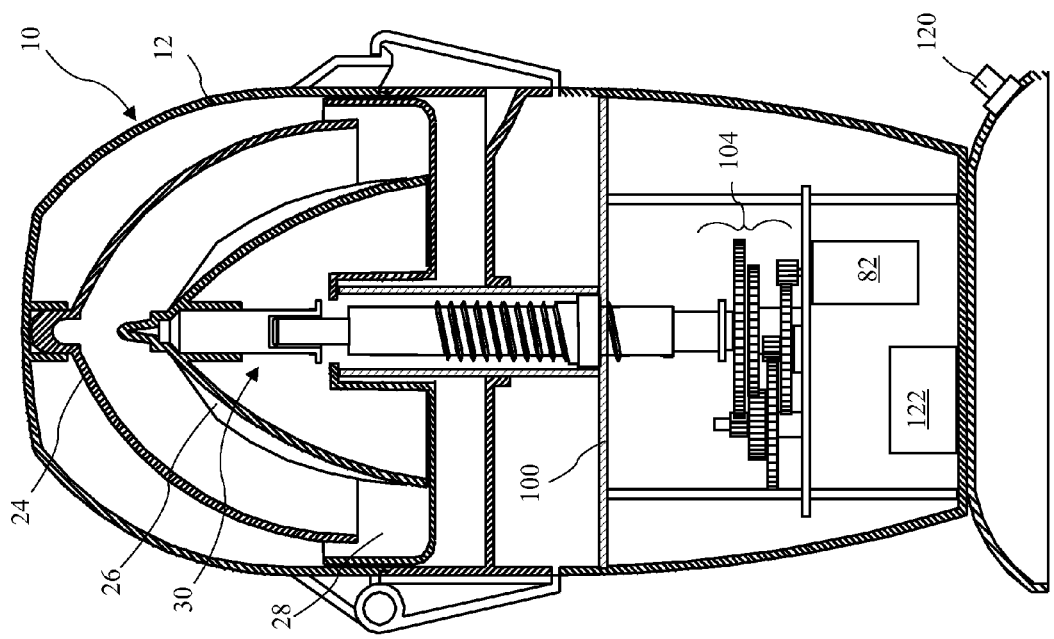

AUTOMATED JUICE EXTRACTOR

The present application is a Continuation In Part of U.S. patent application Ser. No. 12/206,964 filed Sep. 9, 2008, which application is incorporated in its entirety herein by reference.

BACKGROUND OF THE INVENTION

The present invention relates to juice extractors and in particular the electric juice extractors.

Juice extractors are commonly used to extract juice from, for example, oranges. Known manual juice extracts comprise a bowl with a raised conical ridged center, called a juicing cone. A user cuts a fruit in half, and pushes and rotates the exposed cut side down over the juicing cone. The juice is thereby released into the bowl.

Manual juice extractors have been largely replaced by electric juicers. Various electric juicers exist, including centrifugal juicers which include blades and spins to separate the juice from pulp, masticating which grinds and then squeezes the juice from the pulp, and simple citrus juicers which resemble a manual juicer but include an electric motor to rotate the juicing cone.

While the known juicers are often satisfactory, users still desire a simple automatic juicer which is not as rough on the fruit as the centrifugal or masticating juicers, but does not require the users to manually push the fruit on the electrically turned juicing cone. U.S. patent application Ser. No. 12/206,964 filed Sep. 9, 2008 by the present applicant discloses an automated juicer providing many of the benefits desired, however, further development resulted in an alternative embodiment which simplifies manufacturing.

BRIEF SUMMARY OF THE INVENTION

The present invention addresses the above and other needs by providing an automatic juicer which turns and pushes an upward facing juicing cone into a fruit for releasing and collecting juice. The juicer includes a base containing a motor, gear and shaft assembly which rises as a unit lifting and turning the juicing cone. A fixed guide extends upward from the base and inner and outer shafts reside inside the fixed guide and are driven by the motor and gear assembly to rotate and advance the juicing cone into the fruit. The outer shaft includes external threads which engage internal threads of a fixed collet at the base of the fixed guide to translate rotation into vertical translation. The outer shaft includes threads to vertically advance and retreat the outer and inner shafts when the outer shaft turns. The inner shaft rises with the outer shaft and lifts and rotates the juicing cone thereby releasing juice from the fruit. A strainer and a bowl below the juicing cone filter and catch the juice. The strainer advances vertically with juicing cone but does not rotate so that knife edges on the bottom of the juicing cone scrape pulp from the strainer to prevent clogging. The bowl is fixed to the base.

In accordance with one aspect of the invention, there is provided an automatic juicer. The juicer includes a base, a lid attached to the base and openable to allow fruit to be placed in the juicer; a center column assembly attached to the base and including a collet fixed to the base and having internal threads, and a motor, gear and shaft mechanism inside the juicer and advancing and retreating vertically as a unit. The motor, gear and shaft mechanism includes a motor in the base, a gear set in the base and engaging the motor, and a shaft assembly extending above the base. The shaft assembly includes an outer shaft threadably engaging the collet for vertically advancing and retreating when turned by the motor through the gear set, and an inner shaft rotating inside the outer shaft and advancing and retreating vertically with the outer shaft. An upward facing juicing cone is attached to the inner shaft and rotates and advances vertically with the inner shaft into a fruit. A bowl resides under the juicing cone and is attached to the base. The juicing cone thereby rotates and pushes into a fruit for releasing juice from the fruit to be caught in the bowl.

In accordance with another aspect of the invention, there is provided an automatic juicer. The juicer includes a base containing a motor and a gear set engaging the motor. A lid is attached to the base and is openable to allow fruit to be placed in the juicer. A center column assembly is attached to the base and includes a collet fixed to the base. An outer shaft threadably engages the collet and vertically advances and retreats when turned by the motor through the gear set. An inner shaft rotates inside the outer shaft and advances and retreats vertically with the outer shaft and rotates at a higher speed than the outer shaft, when turned by the motor. A bowl is attached to the base and an upward facing juicing cone is attached to the inner shaft and rotates and advances vertically with the inner shaft, rotating and pushing into a fruit for releasing juice from the fruit to be caught in the bowl. A non-rotating strainer advances and retreats vertically with the juicing cone and knife edges on a bottom surface of the juicing cone clear pulp blocking the strainer.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 is a cross-sectional view of the juicer according to the present invention with the juicing cone in a down position and the lid closed.

FIG. 4 is a cross-sectional view of the juicer according to the present invention with the juicing cone in a down position and the lid open.

FIG. 9A is a side view of an outer tube (or column), according to the present invention, of the center column of the juicer.

FIG. 9B is a bottom view of an outer tube, according to the present invention, of the center column of the juicer.

FIG. 9C is a side view of an outer tube, according to the present invention, of the center column assembly of the juicer.

FIG. 9D is a cross-sectional view of the outer tube taken along line 9D-9D of FIG. 9A.

FIG. 9E is a cross-sectional view of the outer tube taken along line 9E-9E of FIG. 9C.

FIG. 12A is a side view of a driven shaft, according to the present invention, of the center column assembly of the juicer.

FIG. 12B is a bottom view of the driven shaft of the center column assembly of the juicer.

FIG. 12C is a top view of the driven shaft of the center column assembly of the juicer.

FIG. 13A is a side view of a lift tube, according to the present invention, of the center column assembly of the juicer.

FIG. 13B is a bottom view of the lift tube of the center column assembly of the juicer.

FIG. 13C is a top view of the lift tube of the center column assembly of the juicer.

FIG. 14 is a cross-sectional view of the lift tube taken along line 14-14 of FIG. 13A.

FIG. 15 is a second embodiment of a center column assembly according to the present invention of the juicer.

FIG. 16 shows a second fruit holder with an adjustable seat.

FIG. 17A shows a clutch and gearing assembly according to the present invention in a high speed position.

FIG. 17B shows the clutch and gearing assembly according to the present invention in a high torque position.

FIG. 18A is a side view of a second embodiment of a motor, gear, and shaft mechanism in a down position of the juicer according to the present invention.

FIG. 18B is a side view of the second embodiment of a motor, gear, and shaft mechanism in an up position of the juicer according to the present invention.

FIG. 19A is a detailed side view of the second embodiment of a motor, gear, and shaft mechanism of the juicer according to the present invention.

FIG. 19B is a detailed top view of the second embodiment of a motor, gear, and shaft mechanism of the juicer according to the present invention.

FIG. 22A shows the second embodiment of a motor, gear, and shaft mechanism in the juicer in the down position.

FIG. 22B shows the second embodiment of a motor, gear, and shaft mechanism in the juicer in the up position.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 2:
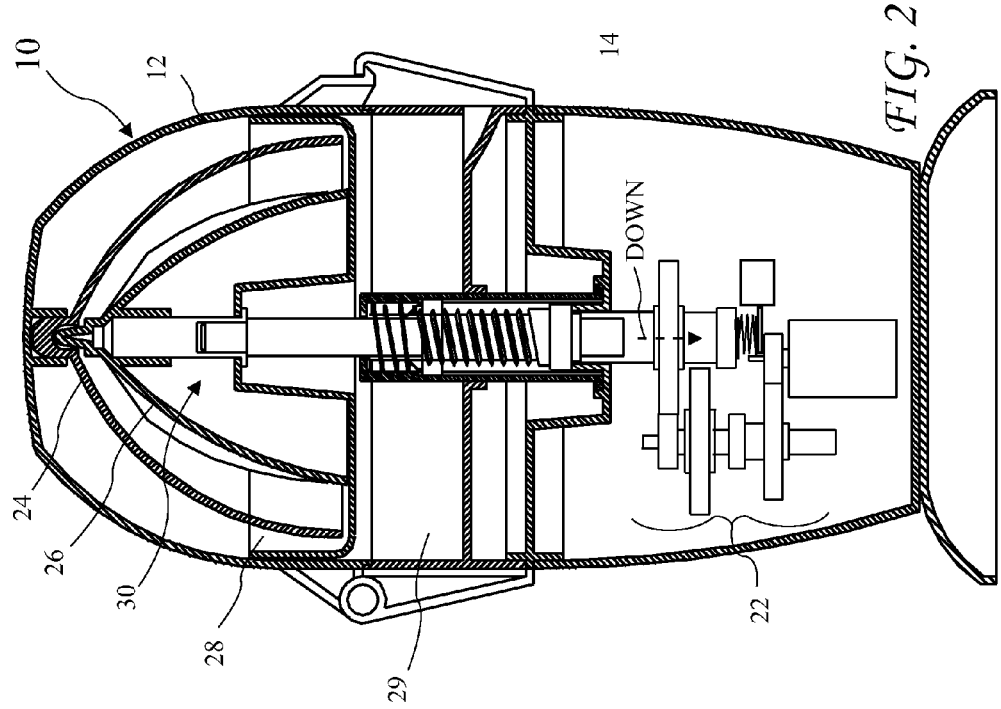
FIG. 2 is a cross-sectional view of the juicer according to the present invention with a juicing cone in an up position and the lid closed.
Figure 1:
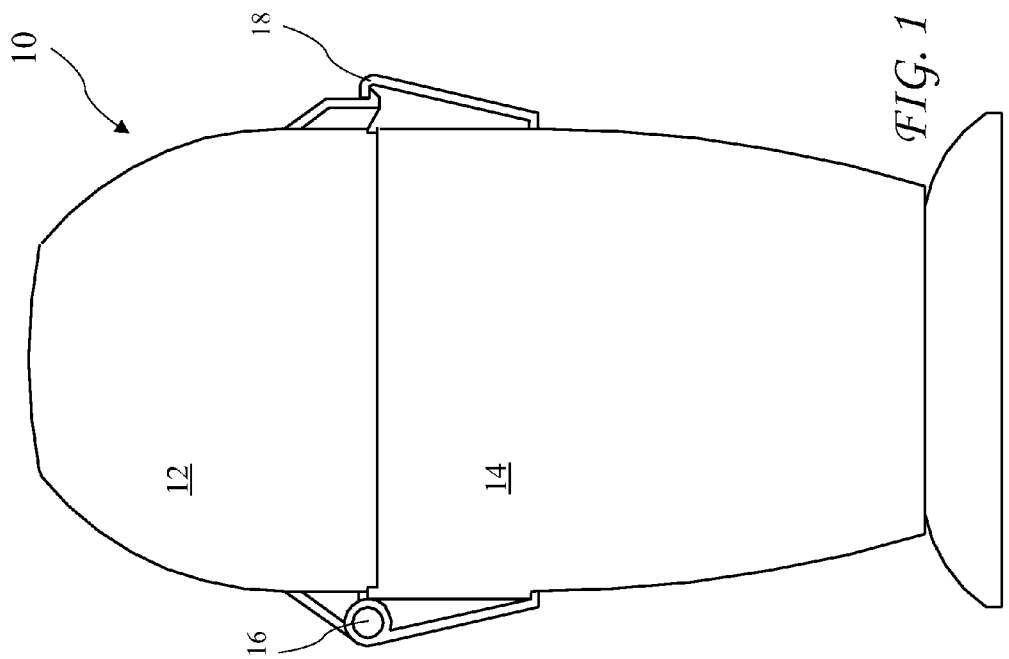
FIG. 1 is a juicer according to the present invention.

A juicer 10 according to the present invention is shown in FIG. 1, a cross-sectional view of the juicer 10 with a juicing cone in an up position and a lid 12 closed is shown in FIG. 2, a cross-sectional view of the juicer 10 with a juicing cone in a down position and the lid 12 closed is shown in FIG. 3, and a cross-sectional view of the juicer 10 with a juicing cone in a down position and the lid 12 open is shown in FIG. 4. A hinge 16 connects the lid 12 to the base 14, and a latch 18 holds the lids closed during operation of the juicer 10. The fruit holder 24 includes anti-slip elements on the inside fruit surface to prevent the fruit from rotating inside the fruit holder 24 during operation of the juicer. The anti-slip elements may be spikes, ridges or the like, for example ridges 24'.

The juicer 10 includes a base 14 housing a motor 20 and a gearing assembly 22 (see FIGS. 17A and 17B for details). The motor 20 may be manually controlled by a user to operate in a first direction to raise the juicing cone against fruit for about 5 seconds and then manually controlled to lower the juicing cone, or may be automated to raise the juicing cone against fruit for about 5 seconds and then automatically reverse. The motor 20 and the gearing assembly 22 may alternatively be controlled by measuring the vertical force of the juicing cone against the fruit, and the motor direction reversed when the force reaches a predetermined level.

The juicer 10 includes a fruit holder 24, the juicing cone 26, a strainer 28, and a bowl 29. The fruit holder 24 is fixed inside the lid 12 and opens with the lid 12. The juicing cone 26 includes ridges 25 (see FIG. 5C) and rises into the fruit and rotates. The ridges 25 cut into the pulp of the fruit to release fruit juice and the rising juicing cone 26 compresses the pulp to further release the juice. The strainer 28 resides under the juicing 26 cone and rises with the juicing cone 26 but does not rotate. The bowl 29 is fixed to the base 14 and does not rise or rotate, and catches the juice released from the fruit.

Figure 5A:
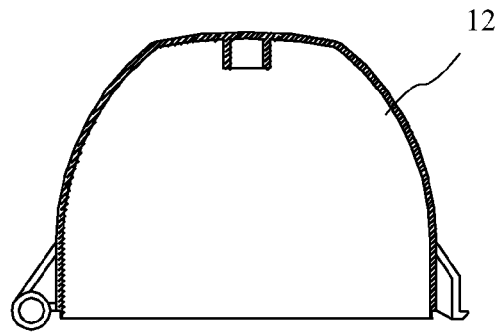
FIG. 5A is a cross-sectional view of the lid of the juicer.
Figure 5B:
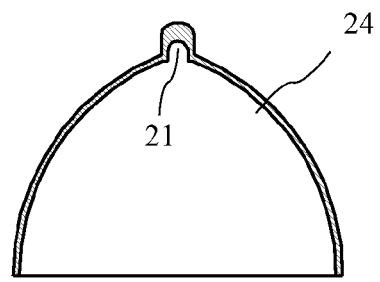
FIG. 5B is a cross-sectional view of a fruit holder, according to the present invention, of the juicer.
Figure 5C:
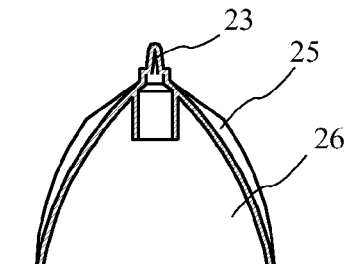
FIG. 5C is a cross-sectional view of the juicing cone, according to the present invention, of the juicer.
Figure 5D:
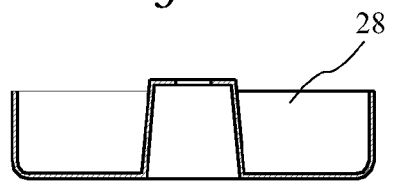
FIG. 5D is a cross-sectional view of a strainer, according to the present invention, of the juicer.
Figure 5E:
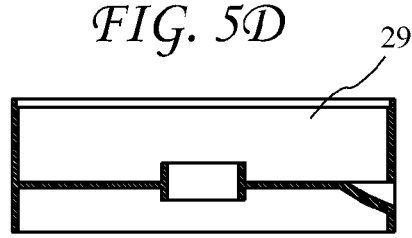
FIG. 5E is a cross-sectional view of a bowl, according to the present invention, of the juicer.

A cross-sectional view of the lid 12 of the juicer 10 is shown in FIG. 5A, a cross-sectional view of the fruit holder 24, according to the present invention, of the juicer 10 is shown in FIG. 5B, a cross-sectional view of the juicing cone 26, according to the present invention, of the juicer 10 is shown in FIG. 5C, a cross-sectional view of a strainer 28, according to the present invention, of the juicer 10 is shown in FIG. 5D, and a cross-sectional view of a bowl 29, according to the present invention, of the juicer 10 is shown in FIG. 5E. The upward facing face of the juicing cone 26 includes ridges 25 for cutting into the pulp of the fruit and a lower end of the juicing cone 26 includes blades (or scrapers) 27 which scrape against a top surface of the strainer 28 to prevent pulp from blocking the strainer 28 during use. The fruit holder 24 includes a seat 21 for limiting upward movement of the juicing cone 26, and the juicing cone 26 includes a stop 23 for cooperation with the seat 21.

Figure 6:
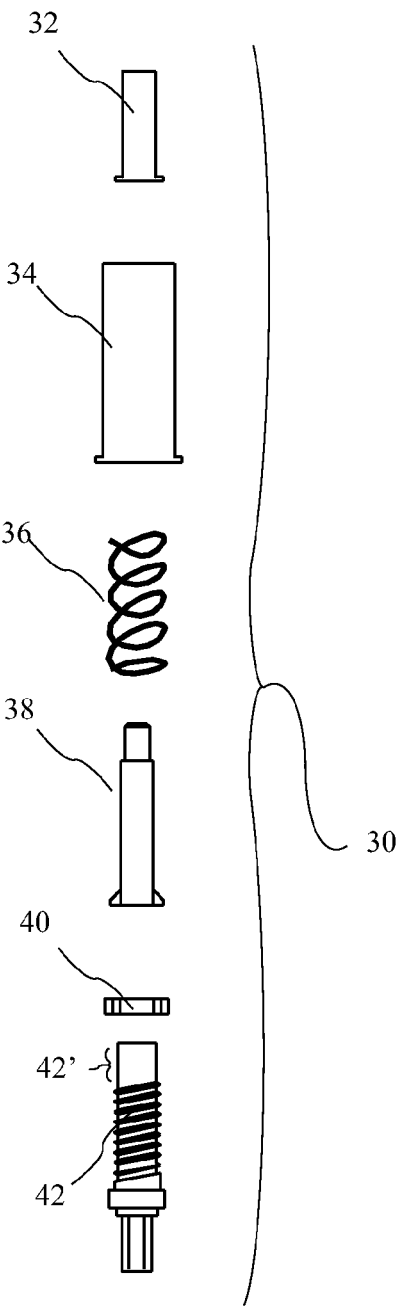
FIG. 6 is an exploded view of a center column assembly, according to the present invention, of the juicer.
Figure 7:
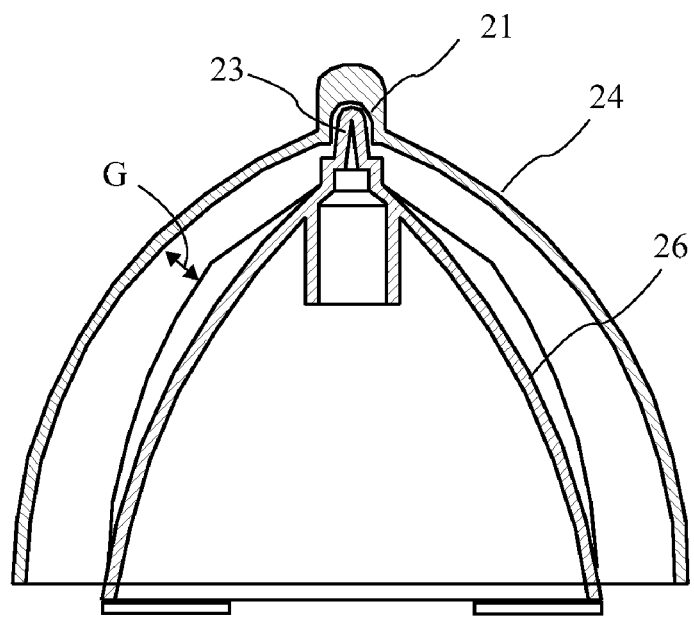
FIG. 7 shows a vertical stop according to the present invention.

An exploded view of a center column assembly 30 according to the present invention of the juicer 10 is shown in FIG. 6. The center column assembly 30 includes a rotating and vertically translating lift tube 32, a stationary (non-rotating and non-translating) outer tube 34 attached to the base 14 (see FIG. 1), a spring 36, a driven shaft 38, a nut 40, and a drive shaft 42. The lift tube 32 lifts and rotates the juicing cone 26. The spring 36 resides inside the outer tube 34 and provides downward force on the driven shaft 38 and/or the nut 40 to bias the center column assembly 30 towards a down position (see FIGS. 2-4). The driven shaft 38 resides inside the drive shaft 42 and is keyed to rotate with the drive shaft 42 but free to vertically translate. The nut 40 is threaded into the exterior of the drive shaft 42 and includes at least one outside notch 44 (see FIG. 11B) to engage a vertical rail 39 (see FIG. 9D) in the outer tube 34 to prevent the nut 40 from rotating with the drive shaft 42. A smooth portion 42' at the top of the drive shaft 42 allowing the drive shaft 42 to rotate freely from the nut 40 at maximum extension.

Figure 8:
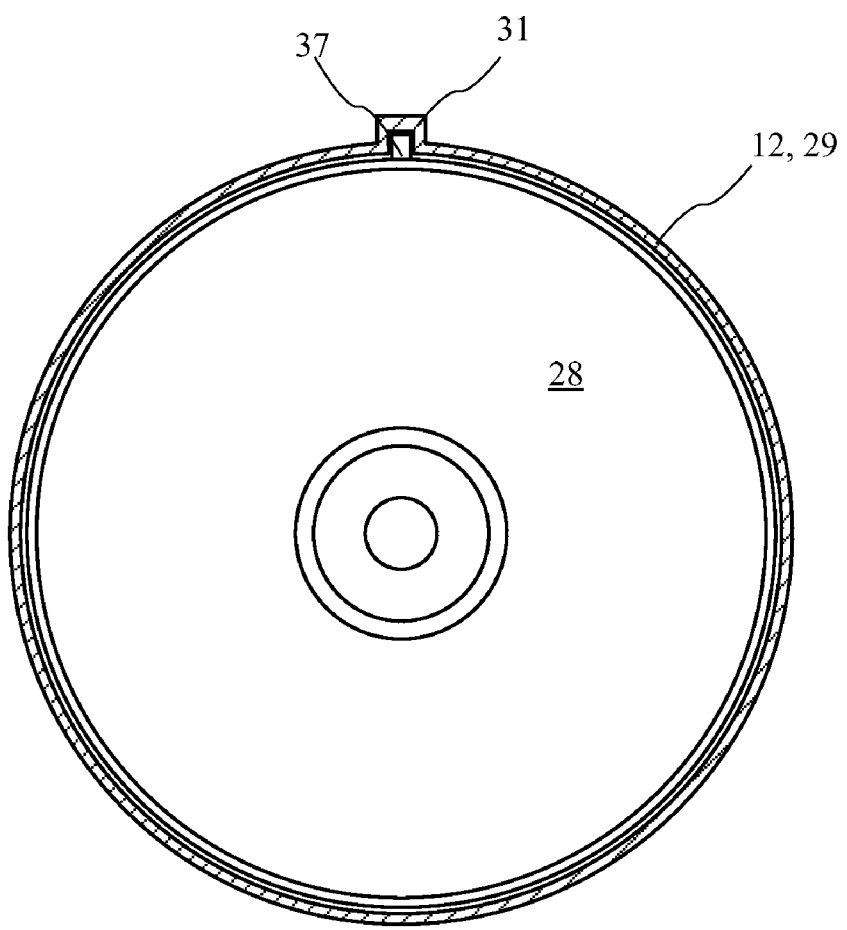
FIG. 8 shows a strainer key and key way.

A vertical stop according to the present invention is shown in FIG. 8. The juicing cone 26 includes a stop 23 at the peak of the cone, and the fruit holder 24 includes a seat 21 above the stop 23. The seat 21 limits the vertical movement of the juicing cone 26 to establish a minimum gap G between the ridges 25 and the interior of the fruit holder 24 to prevent or reduce the ridges 25 cutting into the fruit rind.

A strainer key 37 and key way 31 are shown in FIG. 8. The key 37 resides on an edge of the strainer and engages the key way 31 in the lid 12 and/or bowl 29 to prevent rotation of the strainer 28 so that the blades 27 on the bottom of the juicing cone 26 can scrape pulp from the inside of the strainer 28, which pulp might otherwise block the strainer 28.

A side view of the outer tube (or column) 34 of the center column assembly 30 of the juicer 10 is shown in FIG. 9A, a bottom view of the outer tube 34 is shown in FIG. 9B, a side view of the outer tube 34 is shown in FIG. 9C, a cross-sectional view of the outer tube 42 taken along line 9D-9D of FIG. 9A is shown in FIG. 9D, and a cross-sectional view of the outer tube 34 taken along line 9E-9E of FIG. 9C is shown in FIG. 9E. The outer tube 34 has a cylindrical exterior and cylindrical interior with an outer tube flange 35 at the base for attaching to the juicer base 14. The outer tube 34 is fixed and neither rotates nor translates. An interior vertical rail 39 runs the length of the interior and cooperates with one of the notches 44 (see FIG. 11B) of the nut 40 to prevent rotation of the nut. The outer tube 34 includes a ceiling 37 for cooperation with the spring 36. While a preferred outer tube 34 has a cylindrical interior and exterior, a juicer according to the present invention with an outer column which is not cylindrical is intended to come within the scope of the present invention.

Figure 10C:
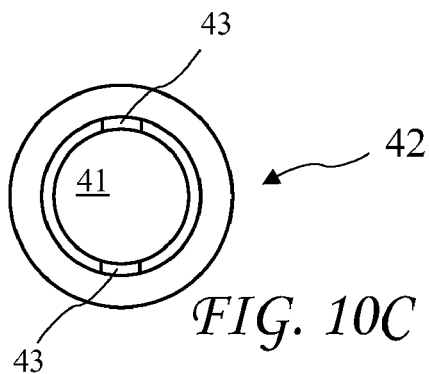
FIG. 10C is a top view of the drive shaft of the center column assembly of the juicer.
Figure 10A:
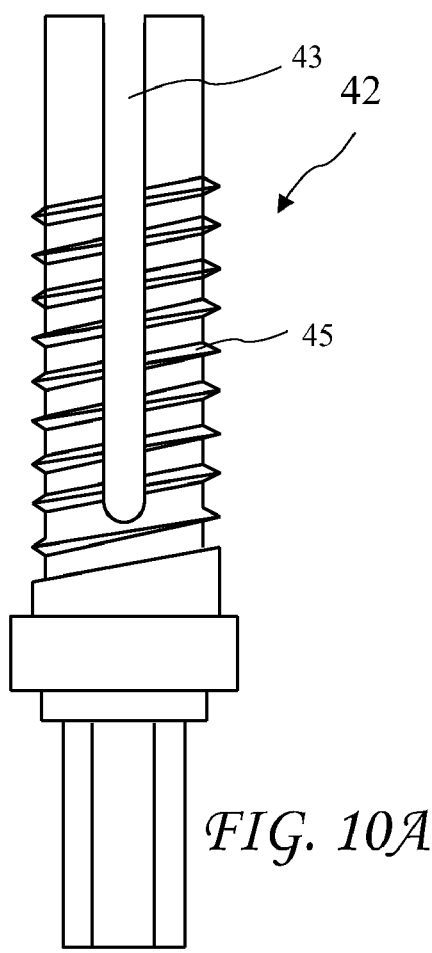
FIG. 10A is a side view of a drive shaft, according to the present invention, of the center column of the juicer.
Figure 10B:
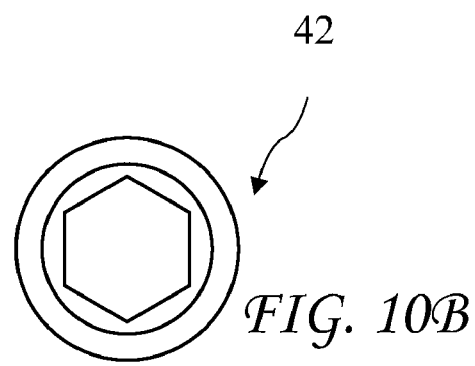
FIG. 10B is a bottom view of the drive shaft of the center column assembly of the juicer.

A side view of a drive shaft 42, according to the present invention, of the center column assembly 30 of the juicer 10 is shown in FIG. 10A, a bottom view of the drive shaft 42 is shown in FIG. 10B, and a top view of the drive shaft 42 is shown in FIG. 10C. The drive shaft 42 is connected to the motor 20 through the gearing assembly 22 (see FIG. 2) and is rotated by the gearing assembly 22 but does not translate. The drive shaft 42 includes threads 45 on a cylindrical exterior for cooperation with a threaded interior 47 (see FIG. 11B) of the nut 40. Because the outer tube 34 prevents rotation of the nut 40, rotation of the drive shaft 42 causes the nut 40 to translate vertically. The drive shaft 42 further includes a lengthwise inner passage 41 and key ways 43 running vertically lengthwise into the inner passage 41. The inner passage 41 is preferably cylindrical to reduce manufacturing costs, but may have other cross-sections.

Figure 11B:
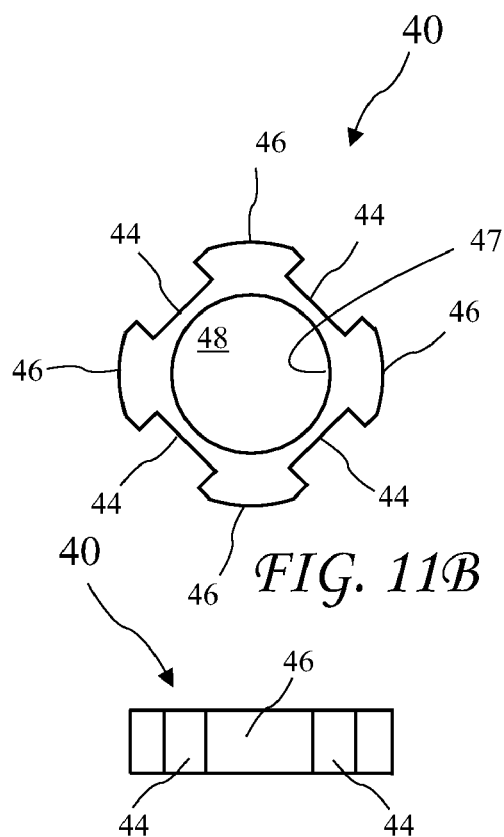
FIG. 11B is a top view of the nut of the center column assembly of the juicer.
Figure 11A:
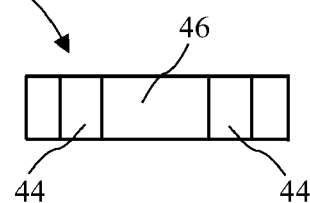
FIG. 11A is a side view of a nut, according to the present invention, of the center column assembly of the juicer.

A side view of the nut 40, according to the present invention, of the center column assembly 30 of the juicer 10 is shown in FIG. 11A, and a top view of the nut 40 is shown in FIG. 11B. The nut 40 includes a threaded interior 47 for cooperation with threads 45 on the drive shaft 42 (see FIG. 10A) and external notches 44 and external lands 46 on the exterior of the nut. The lands 46 center the nut 40 in the inner passage 41 of the drive shaft 42 and the notches 44 prevent the nut 40 from rotating inside the outer column 34. Only one notch 44 is required and in another embodiment, the nut may include a projecting key for cooperation with a key way inside the outer column 34.

A side view of the driven shaft 38, according to the present invention, of the center column assembly 30 of the juicer 10 is shown in FIG. 12A, a bottom view of the driven shaft 38 is shown in FIG. 12B, and a top view of the driven shaft 38 is shown in FIG. 12C. The driven shaft includes two keys 48 for cooperation with the key ways 43 in the drive shaft 42, causing the driven shaft 38 to rotate with the drive shaft 42 but allowing the driven shaft 38 to translate vertically with respect to the drive shaft 42. The driven shaft 38 further includes a cylindrical body 50 and a hexagonal nose 54 at an upper end for engaging the lift tube 32.

A side view of a lift tube 32, according to the present invention, of the center column assembly 30 of the juicer 10 is shown in FIG. 13A, a bottom view of the lift tube 32 is shown in FIG. 13B, a top view of the lift tube 32 is shown in FIG. 13C, and a cross-sectional view of the lift tube 32 taken along line 14-14 of FIG. 13A is shown in FIG. 14. The lift tube 32 has a hexagonal exterior 6, a round base flange 58, and a hexagonal recess 56 in the base for cooperation with the nose 54 of the driven shaft 38 (see FIG. 12A). The lift tube is lifted and rotated by the driven shaft 38 and lifts and rotates the juicing cone 26 (see FIG. 5C).

A second embodiment of a center column assembly 70, according to the present invention, of the juicer 10, is shown in FIG. 15. The center column assembly 70 includes an inner tube 74, a second outer tube 34', and a hexagonal driven shaft 72. The second outer tube 34' is similar to the outer tube 34, but does not include the ceiling 37, allowing the inner tube 74 to be inserted into the top of the outer tube 34' and have an outer diameter sliding into the interior of the outer tube 34'. The exterior of the inner tube 74 includes a notch 76 running the length of the inner tube 74 to engage the vertical rail 39 of the outer tube 34' to allow the inner tube 74 to translate vertically within the outer tube 34', but to cause the inner tube 74 to rotate with the outer tube 34'. The hexagonal driven shaft 72 engages the juicing cone 26 to lift and rotate the juicing cone 26 (see FIG. 5C). The center column assembly 70 is otherwise similar to the center column assembly 30.

A second fruit holder 24' with an adjustable seat 80 is shown in FIG. 16. The adjustable seat 80 preferably includes threads which cooperate with the fruit holder 24' to allow adjustment of the gap G between the juicing cone 26 and the fruit holder 24'.

The gearing assembly 22 (see FIG. 2) according to the present invention is shown in a high speed position in FIG. 17A and in a high torque position in FIG. 17B. The gearing assembly 22 includes a motor 82, switch 84, first gears 94 and 96, second gears 90 and 92, third gears 86 and 88, and a spring 98. The gears 94 and 96 are always engaged. In the relaxed (or UP) position, the spring 98 pushed the gears 90 and 86 upwards, and the gear 90 engages the gear 92 to provide high speed. In the compressed (or DOWN) position, the spring 98 is compressed allowing the gears 90 and 86 to move downward, and the gear 86 engages the gear 88 to provide high torque. The spring 98 further provides a relief from exerting too great a downward force on the gearing assembly 22 or too much upward force on the juicing cone 26. The springs 98 and 36 (see FIG. 6) combine to limit the force exerted on the fruit to preferably between one pound and 50 pounds, and more preferably limit the force exerted on the fruit to between ten pounds and 25 and most preferably limit the force exerted on the fruit to approximately 18 pounds.

A side view of a second embodiment of a motor, gear, and shaft mechanism 102 in a down position is shown in FIG. 18A and a side view of the second embodiment of a motor, gear, and shaft mechanism in the "UP" position is shown in FIG. 18B. The mechanism 102 includes the motor 82 mounted below a mounting plate 106, a gear set 104 mounted above the mounting plate 106, an outer shaft 116 connected to the gears 104 resides above the mounting plate 106, and an inner shaft 114 is also connected to the gears 104 resides above the mounting plate 106. The mounting plate 106 slides vertically with the outer shaft 116 on vertical posts 108 which are connected between a base flange 112 and an upper base plate 100.

The outer shaft 116 has male threads 118 on a lower portion, and the threads 118 engage female threads (not shown) inside a fixed collet 110 attached to the plate 100. The motor 82 turns the inside and outside shafts 114 and 116 thought the gear set 104, generally at different speeds, and the rotation of the outside shaft 116 causes the mechanism 102 to raise and lower. The male threads 118 on the outside shaft 116 do not extend to the base of the outside shaft 116, and as a result, the threads 118 may disengage from the collet 110 allowing the outer shaft 116 to continue to turn after reaching a highest position in the juicer.

A detailed side view of the motor, gear, and shaft mechanism 102 is shown in FIG. 19A and a detailed top view of the motor, gear, and shaft mechanism 102 is shown in FIG. 19B. The inside shaft 114 is free to rotate inside the outside shaft 116 independently of the outside shaft 116 and preferably turns at a higher speed than the outer shaft 116.

Figure 20:
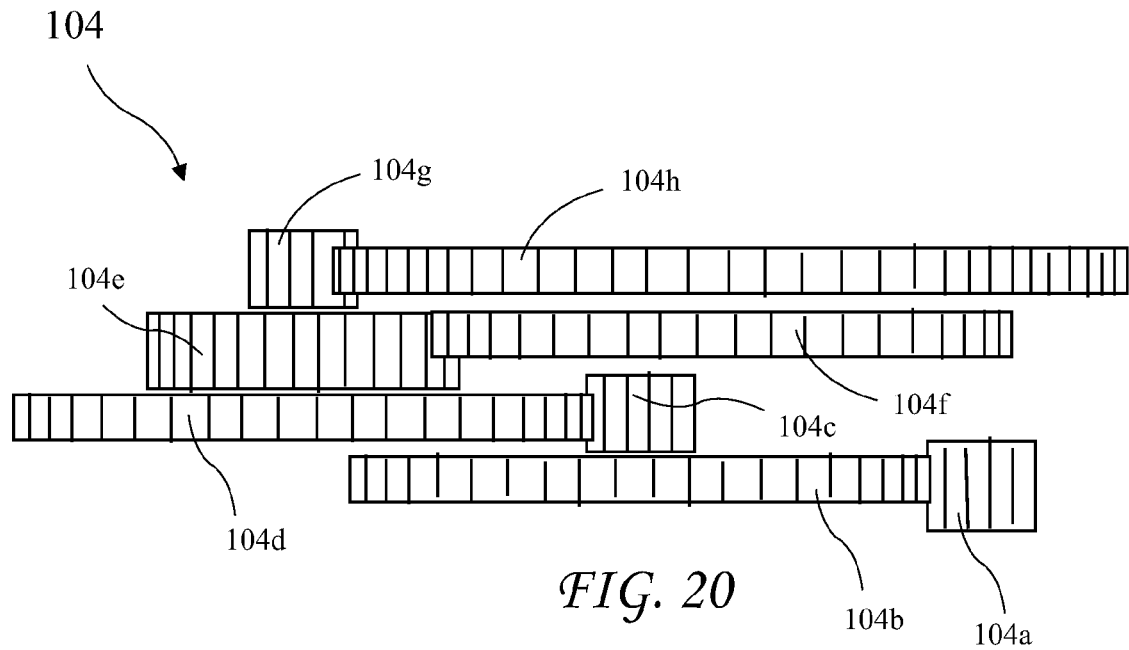
FIG. 20 is a more detailed view of a gear set of the second embodiment of the juicer according to the present invention.

A more detailed view of the gear set 104 is shown in FIG. 20. A small first gear 104a is connected to the motor 82. A large gear 104b engages the gear 104a and rotates at a lower speed than the motor 82. A second small gear 104c is connected to the gear 104b and rotates at the same speed as the gear 104b. A second large gear 104d engages the gear 104c and rotates at a lower speed than the gear 104 and at a much lower rate than the motor 82. Both the small gear 104g and the medium size gear 104e, are attached to the gear 104d and turn at the same speed as the gear 104d. The large gear 104f engages the medium gear 104 and rotates somewhat slower than the gear 104e. The large gears 10h engages the small gear 104g and rotates slower than the gear 104g.

The outer shaft 116 is connected to the gear 104h and rotates at the same speed as the gear 104h and the inner shaft 114 is connected to the gear 104f and rotates at the same speed as the gear 104f. As a result both the outer shaft 116 and the inner shaft 114 turn much slower than the motor 81, and the inner shaft 114 preferably turns faster than the outer shaft 116. In a simpler embodiment with fewer gears, the inner shaft 114 turns at the same speed as the outer shaft 116.

Figure 21:
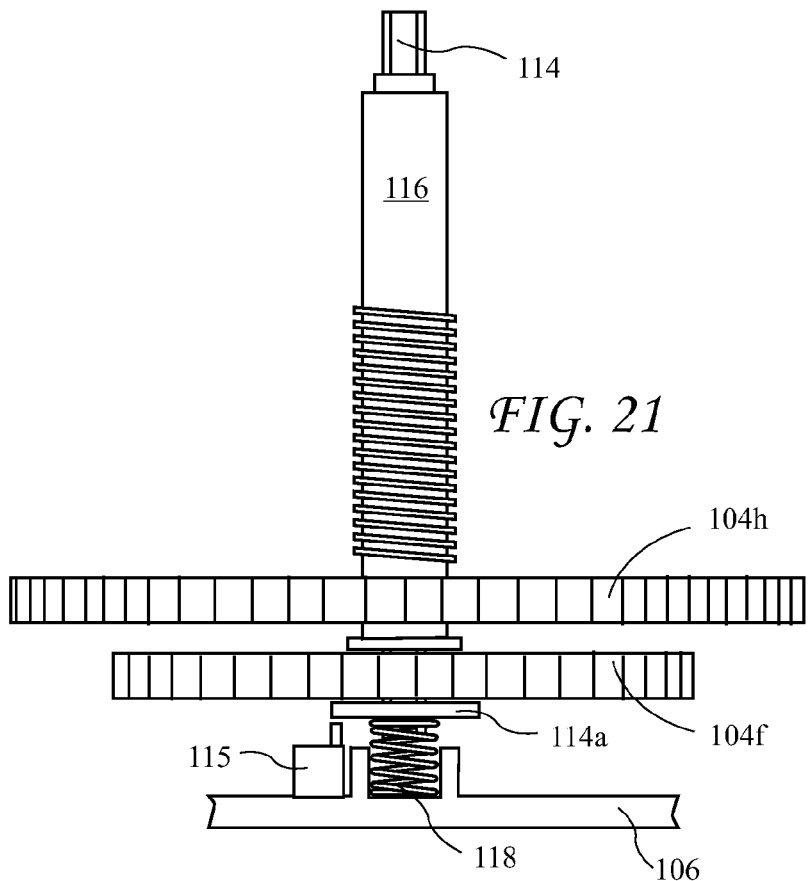
FIG. 21 is a side view of an outer shaft and an inner shaft of the second embodiment of the juicer according to the present invention.

A side view of the outer shaft 116 and the inner shaft 114 with a spring 118 providing vertical support to the inner shaft 114, thus limiting the force exerted by the juicing cone 26 (see FIGS. 22A and 22B) on the fruit, is shown in FIG. 21. The spring 117 preferably limits the force exerted on the fruit to preferably between one pound and 20 pounds, and more preferably limits the force exerted on the fruit to between ten pounds and 20 and most preferably limits the force exerted on the fruit to approximately 18 pounds. An inner shaft flange 114a maybe provided to contact a switch 115 to reverse the direction of the motor 82 when a desired vertical force has been achieved compressing the spring 117. The switch 115 is electrically connected to electronics 122 in the base of the juicer (see FIG. 22A).

The mechanism 102 is shown in the juicer 10 in FIG. 22A in the down position and in FIG. 22B in the up position. Other than the mechanism 102, the second embodiment of the juicer 10 is similar to the embodiment described in FIGS. 1-17B. The juicer 10 in FIG. 22 shows the mechanism 102 in the up position with the juicing cone 26 lifted to push the juicing cone 26 into the fruit. The strainer 28 is preferably carried vertically by the outer shaft 114 and raises and lowers with the juicing cone 26 and may rotate with the juicing cone 26, but preferably is keyed to the juicer housing and does not rotate, thereby being cleared by the bottom surface of the rotating juicing cone.

A switch 120 is electrically connected to electronics 122 in the base of the juicer. The switch 120 starts the operation of the juicer and the direction of the motor 82 is initially to advance the juicing cone 26 into the fruit. The motor 82 direction may be reversed after a period of time to vertically retreat the juicing cone from the fruit using a timer in the electronic 122, or after a preset resistance to advancing the juicing cone into the fruit is experienced by compression of the spring 118 actuating the switch 115 (see FIG. 21).

While the invention herein disclosed has been described by means of specific embodiments and applications thereof, numerous modifications and variations could be made thereto by those skilled in the art without departing from the scope of the invention set forth in the claims.

I claim:

1. An automatic juicer comprising:
   a lid openable to allow fruit to be placed in the juicer;
   a base containing a motor;
   a center column assembly attached to the base;
   a collet fixed to the base;
   an outer shaft threadably engaging the collet to vertically advance and retreat when turned by the motor;
   an inner shaft rotating inside the outer shaft and advancing and retreating vertically with the outer shaft, the juicing cone attached to the inner shaft and rotating and advancing vertically with the inner shaft, for rotating and pushing into a fruit for releasing juice from the fruit to be caught in the bowl;
   the inner shaft rotates at a higher speed than the outer shaft
   a bowl attached to the base below the juicing cone; and
   the juicing cone rotating and pushing into a fruit for releasing juice from the fruit to be caught in the bowl.

2. The juicer of claim 1, further including a strainer between the bowl and the juicing cone.

3. The juicer of claim 2, wherein, the strainer advances vertically with the juicing cone.

4. The juicer of claim 3, wherein the strainer rotate with the juicing cone.

5. The juicer of claim 2, wherein:
   the strainer does not rotate; and
   the juicing cone includes knife edges on a bottom surface for clearing pulp blocking the strainer.

6. The juicer of claim 5, wherein the strainer includes a key and at least one of the bowl and the lid includes a key way for cooperation with the key to prevent rotation of the strainer.

7. The juicer of claim 1, wherein:
   the outer shaft and the inner shaft are attached to a mounting plate;
   the mounting plate moves vertically with the outer and inner shafts;
   the motor moves vertically with the mounting plate and is connected to the outer and inner shafts through a gear set.

8. The juicer of claim 7, wherein the gear set reduces the rotating speed of the outer and inner shafts with respect to the motor.

9. The juicer of claim 8, wherein the gear set causes the inner shaft to rotate at a higher speed than the outer shaft.

10. The juicer of claim 9, wherein the motor and gear set reside below the mounting plate and the inner and outer shafts reside above the mounting plate.

11. The juicer of claim 8, wherein the motor runs in two directions to either vertically advance or vertically retreat the juicing cone.

12. The juicer of claim 11, wherein the direction of the motor is initially to advance the juicing cone into the fruit, and after a period of time the direction of the motor reverses to vertically retreat the juicing cone from the fruit.

13. The juicer of claim 11, wherein the direction of the motor is initially to advance the juicing cone into the fruit, and after a preset resistance to advancing the juicing cone into the fruit is experienced, the direction of the motor reverses to vertically retreat the juicing cone from the fruit.

14. The juicer of claim 11, wherein the vertical advancing of the juicing cone is limited to prevent the juicing cone from cutting into a rind of the fruit.

15. The juicer of claim 14, wherein the vertical advancing of the juicing cone is limited by cooperation of a stop on the juicing cone with a seat in the lid.

16. The juicer of claim 11, wherein the inner shaft is supported by a spring to limit the force of the juicing cone against the fruit.

17. An automatic juicer comprising:
a base;
a lid attached to the base and openable to allow fruit to be placed in the juicer;
a center column assembly attached to the base and including a collet fixed to the base and having internal threads;
a motor, gear and shaft mechanism inside the juicer and advancing and retreating vertically as a unit and comprising:
    a motor in the base;
    a gear set in the base and engaging the motor; and
    a shaft assembly extending above the base and including:
        an outer shaft turned by the motor through the gear set and threadably engaging the collet for vertically advancing and retreating; and
        an inner shaft turned by the motor through the gear set and rotating inside the outer shaft and advancing and retreating vertically with the outer shaft;
at a higher speed than the outer shaft
a bowl attached to the base; and
an upward facing juicing cone attached to the inner shaft and rotating and advancing vertically with the inner shaft, for rotating and pushing into a fruit for releasing juice from the fruit to be caught in the bowl.

18. An automatic juicer comprising:
a base containing a motor;
a lid openable to allow fruit to be placed in the juicer;
a gear set in the base and engaging the motor;
a center column assembly attached to the base and including a collet fixed to the base;
an outer shaft threadably engaging the collet vertically advancing and retreating when turned by the motor through the gear set; and
an inner shaft rotating inside the outer shaft and advancing and retreating vertically with the outer shaft and rotating at a higher speed than the outer shaft when turned by the motor through the gear set;
a bowl attached to the base;
a juicing cone attached to the inner shaft and rotating and advancing vertically with the inner shaft, for rotating and pushing into a fruit for releasing juice from the fruit to be caught in the bowl;
a non-rotating strainer advancing and retreating vertically with the juicing cone; and
knife edges on a bottom surface of the juicing cone for clearing pulp blocking the strainer.

* * * * *